United States Patent
Faidley

[11] Patent Number: 5,246,193
[45] Date of Patent: Sep. 21, 1993

[54] MOBILE CAMERA MOUNT

[76] Inventor: Warren E. Faidley, P.O. Box 31808, Tucson, Ariz. 85751-1808

[21] Appl. No.: 995,783

[22] Filed: Dec. 23, 1992

[51] Int. Cl.[5] ............................................. F16B 47/00
[52] U.S. Cl. ......................... 248/206.3; 224/42.45 R; 354/293
[58] Field of Search ............... 248/206.3, 206.4, 309.1, 248/309.3; 354/76, 126, 293, 295; 224/311, 321, 42.45 R, 42.46 R, 908

[56] References Cited

U.S. PATENT DOCUMENTS

| | | | |
|---|---|---|---|
| 2,653,001 | 9/1953 | Padjen | 248/206.4 |
| 2,856,146 | 10/1958 | Lehder | 354/293 X |
| 3,176,602 | 4/1965 | Wilt | 354/293 X |
| 4,029,246 | 6/1977 | Woodruff | 354/293 X |
| 4,836,482 | 6/1989 | Sokol | 248/206.3 |
| 4,933,691 | 6/1990 | Leslie | 354/293 X |
| 5,012,335 | 4/1991 | Cohodar | 354/293 X |
| 5,016,850 | 5/1991 | Plahn | 248/206.3 |
| 5,137,238 | 8/1992 | Hutten | 248/206.3 |
| 5,141,191 | 8/1992 | Coffield | 248/206.3 |

Primary Examiner—J. Franklin Foss
Attorney, Agent, or Firm—Ogram & Teplitz

[57] ABSTRACT

A mobile camera mounting device suitable for use within a vehicle for filming activities exterior to the vehicle. The mount, using two suction cups, attaches to the windshield and is secured thereto. The suction cups are attached via swivel blocks to the camera mount. The camera attaches to a horizontal member and is used to record images exterior to the vehicle. In the preferred embodiment, a brace member extends from the horizontal member holding the camera to the windshield or other suitable bracing point. This brace member provides a significant amount of stabilizing since the mount now is secured by three different points.

12 Claims, 3 Drawing Sheets

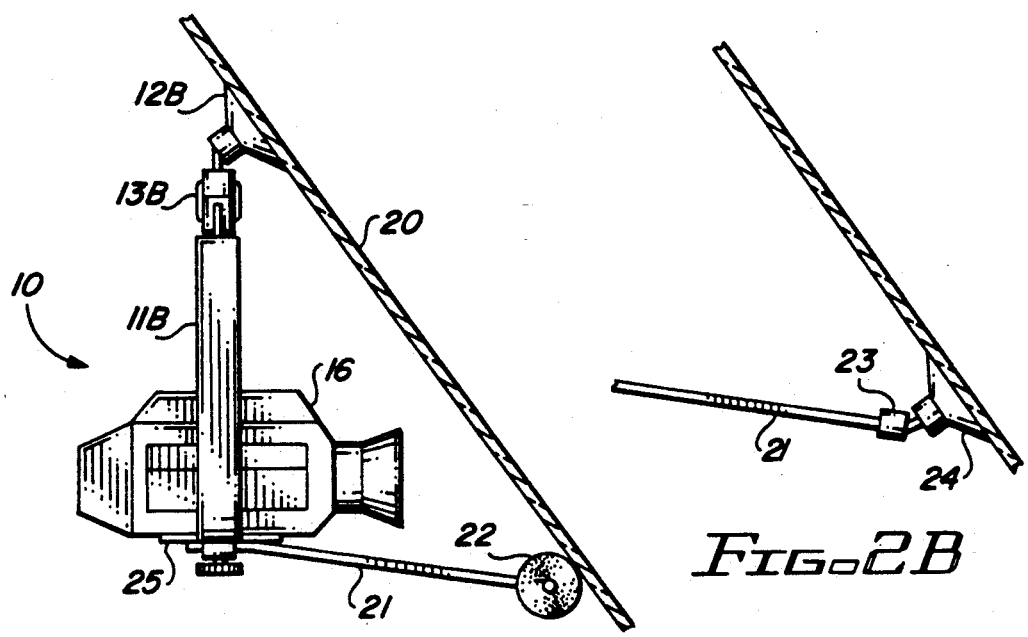
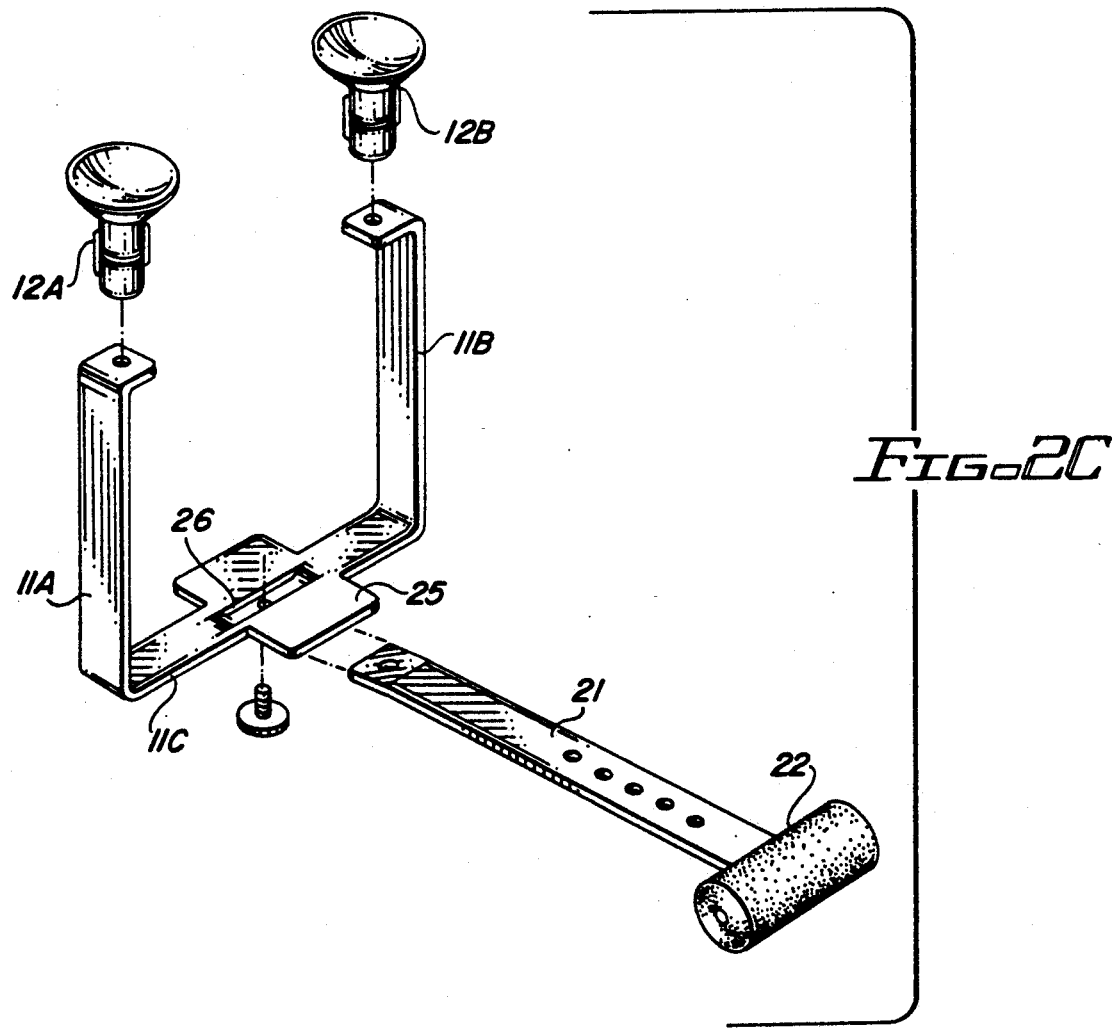

MOBILE CAMERA MOUNT

BACKGROUND OF THE INVENTION

This invention relates generally to camera mounts and more particularly portable camera mounts.

As used herein, the term "motion picture" is intended to include not only chemically developed picture film but also video camera recording and other electronic storage of images.

One of the most critical areas in photographing outside of a studio is properly securing the camera so as to minimize the "jiggles" which become pronounce once the motion picture or video is completed. To this end, a wide range of devices have been developed to assist camera operators reduce the natural vibrations which occur during movement of the camera.

These devices are designed for shoulder use and generally involve a complex assemblage of springs, shock absorbers, and counter weights. Although the resulting assemblage does produce acceptable quality motion pictures, the apparatus is so complex and bulky that it cannot be used in many applications.

One such application where a bulky platform is not usable is inside an automobile or other vehicle. Often motion pictures need to be taken from a vehicle of exterior events. A specific example is the growing use of video cameras by police officers to record the activities of vehicles and drivers. The video tapes have proven extremely powerful in the court room as proof of drunkenness and in at least one situation have resulted in the arrest of the killer of a policeman who had stopped a speeding vehicle.

Construction of mounts within a vehicle usually takes the form of drilling holes, attaching bars via screws or bolts, and constructing a platform on which the camera is mounted. Although this does satisfy the requirements, the costs of installation is prohibitive, the installation is cosmetically unappealing, and the platform is not portable.

It is clear that a need exists for a secure camera mount for vehicles such as automobiles, airplanes, snowmobiles, etc.

SUMMARY OF THE INVENTION

The invention creates a mobile camera mounting device suitable for use within a vehicle for filming activities exterior to the vehicle. The mount, using two suction cups, attaches to the windshield and is secured thereto. The camera attaches to a horizontal member and is used to record images exterior to the vehicle.

In the preferred embodiment, a brace member extends from the horizontal member holding the camera to the windshield or other suitable bracing point. This brace member provides a significant amount of stabilizing affect since the mount now is secured at three different points.

Although the present discussion relates to automobiles, it is readily apparent that the present invention has application to a variety of vehicles including airplanes, snow-mobiles, and the like.

Within this discussion, the invention is described using suction cups to adhere to the windshield of the vehicle. The suction cup is often made of flexible material such as rubber and is constructed to selectively produce a partial vacuum which tends to secure the cup to the planar body. In the preferred embodiment, the suction cups have mechanisms to permit easy application and removal from the windshield. Most suction cups are capable of holding forty pounds each; hence, a unit utilizing two suction cups can easily support eighty pounds of payload. Those of ordinary skill in the art readily recognize other mechanisms which could be used to secure the mount to the windshield.

In the preferred embodiment, the bracket member is substantially "U" shaped wherein suction cups are attached to both legs of the "U". The lower portion of the "U" is substantially flat member permitting a securing mechanism to be installed to affix a camera to the bracket member. Because most cameras are equipped to be secured by a screw/bolt to a tripod, the same screw/bolt arrangement is used to affix the camera to the bracket. An alternative embodiment uses a "quick mount" for easy securement of the camera.

In application, the bracket is secured to the windshield with the suction cups. Once the bracket is secured, the camera is affixed to the screw/bolt so that the camera is focussed on images exterior to the vehicle. The camera is activated to record the details of the view through the windshield, which, in the case of the police application, would then be used in court as evidence.

In some applications where a video camera is being used with the bracket, a separate monitor is mounted to the bracket or on the dash. This monitor is attached to the video camera and gives the driver of the vehicle a larger representation of what the camera is seeing and recording. This enhanced image delivery is extremely useful as it frees up the driver's concentration permitting a more accurate use of control of the vehicle to fully capture the external image of interest.

An important aspect of the present invention is the use of swivel brackets between the suction cup and the camera bracket. The swivel brackets permit the relative angle between the suction cup and the camera bracket to be altered to assure that the assemblage mates with the windshield at the proper angle to obtain the proper viewing angle on the camera.

Swivel brackets are well known in the art. In this application the swivel bracket must include a brake or lock so that once the proper angle is obtained, it can be maintained with camera/bracket combination firmly affixed to the windshield.

To provide even further stabilization to the bracket, a brace member being a substantially straight bar, is used to secure the bottom of the "U". The brace member, in the preferred embodiment, secures to the bolt/screw used to secure the camera and extends to contact another point within the vehicle, such as the base of the windshield.

In one embodiment of the invention, the brace member has a soft pad on one end permitting the brace to press against the windshield without damaging the windshield. In application, the brace is placed against the windshield and is secured to the bolt/screw mechanism. Preferably, the mechanism permitting the brace to attach to the camera mount is slidably attachable permitting the brace to be selectively extended from the bracket to accommodate varying distance which may occur between different vehicles.

In another embodiment of the invention, the end of the brace member is secured via another suction cup. This embodiment provides the greatest stabilization since the bottom of the "U" is now completely secured to the windshield.

In another embodiment of the invention, to assist in the portability of the invention, the bracket is disassembled to consist solely of "linear" pieces which are easily stored in a camera case or carrying bag.

Still another embodiment of the invention uses a square bracket instead of the "U" shape described above. This shape provides for improved firmness in the bracket and also provides an easily accessible handle for carrying of the bracket/camera assembly once it has been removed from the vehicle.

The invention, together with various embodiment thereof, will be more fully described by the following drawings and their accompanying descriptions.

DRAWINGS IN BRIEF

FIG. 2A is a side view of the preferred embodiment of the invention utilizing a brace member and applied to a windshield of an automobile.

FIG. 2B is an alternative brace member used in the application of FIG. 2A.

FIG. 2C is a perspective view of the embodiment of FIG. 2A illustrating the interaction between the components.

DRAWINGS IN DETAIL

Figure 1:
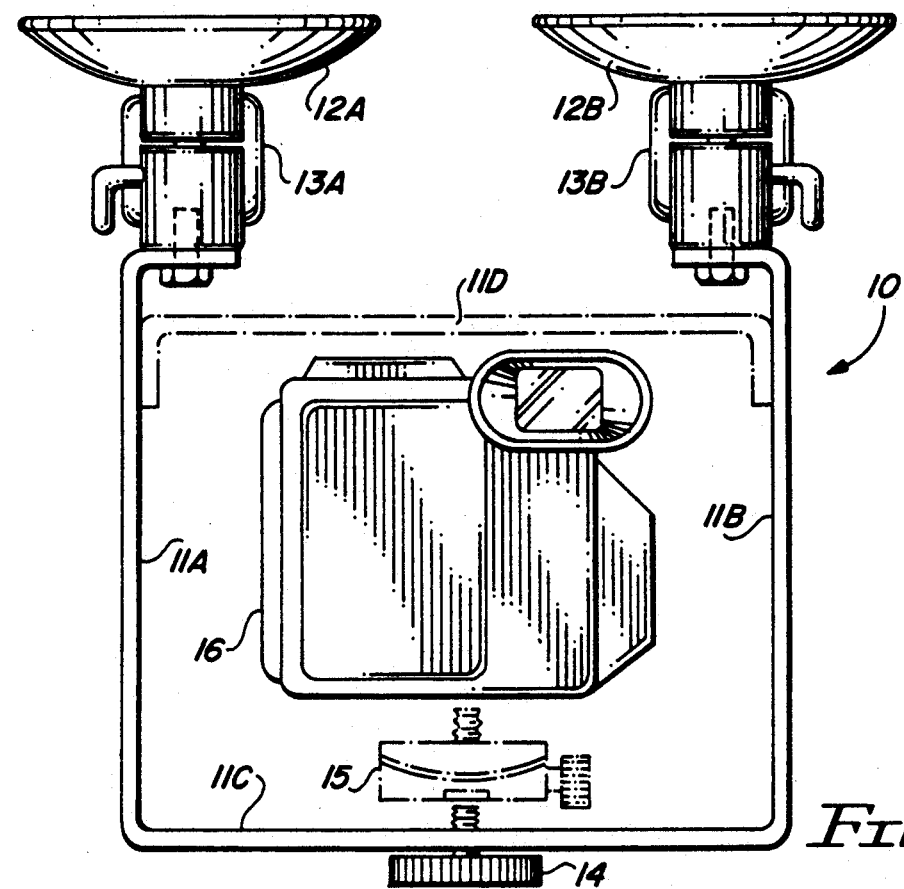
FIG. 1 is a side view of the preferred embodiment of the invention.

FIG. 1 is a side view of the preferred embodiment of the invention.

Support mount 10, in this preferred embodiment, is a substantially "U" shaped bracket composed of legs 11A and 11B with middle member 11C connecting the two legs 11A and 11B. Middle member 11C connects substantially at right angles with legs 11A and 11B.

At one end of each leg 11A and 11B is the suction cup assembly 12A and 12B respectively, which are mounted via swivel blocks 13A and 13B respectively. Using swivel block 13A as illustrative, swivel block 13A permits suction cup 12A to move relative to leg 11A. This ability to move is important since it permits the support mount to be adjusted relative to the windshield (as defined when the suction cup 12A is attached thereto) so that the camera is held in the desired position.

Camera 16 is attached to support mount 10 via connecting screw 14 in middle member 11C which connects to an optional adjustable camera mount 15 which in turn is secured to camera 16.

An optional interconnecting member 11D is provided in other embodiments to provide an even more rigid structure for total support of camera 16.

Camera mount 10 provides an ideal platform for securing the camera so that, while still filming, the operator is able to operate the vehicle.

FIG. 2A is a side view of the preferred embodiment of the invention utilizing a brace member and applied to a windshield of an automobile.

The camera mount 10, as described in FIG. 1, is attached to windshield 20 via the suction cups (12B visible in this angle). Swivel block 13B permits suction cup 12B to rotate relative to leg 11B so that a proper grip is obtained on windshield 20.

Those of ordinary skill in the art readily recognize various commercially available swivel block assemblies which will serve in this capacity.

In this embodiment, camera 16 and camera mount 10 is further stabilized by brace member 21 which attaches to camera mount 10 and presses cushion 22 against a portion of windshield. In this manner, camera mount 10 is secured at three points: suction cup 12B, suction cup 12A (not shown), and cushion 22.

FIG. 2B is an alternative brace member used in the application of FIG. 2A.

Although cushion 22 of FIG. 2B provides additional stabilizing affect, in this embodiment, the connection between brace member 21 and the windshield is enhanced through the use of swivel block 23 and suction cup 24. In this manner, brace member 21, and hence the entire camera block 10, is secured by three fixed points; thereby providing an extremely enhanced picture taking capability.

FIG. 2C is a perspective view of the embodiment of FIG. 2A illustrating the interaction between the components.

Legs 11A and 11B, in this embodiment, are constructed of substantially flat stock which have end portions bent to receive suction cups 12A and 12B respectively.

Brace member 21 is secured to the middle member 11C via clasp 25 and screw 26. Clasp 25 is slotted permitting brace member 21 to be selectably adjusted so that any desired length is obtainable. This allows the brace to meet the demands of the specific situation and vehicle.

Figure 3B:
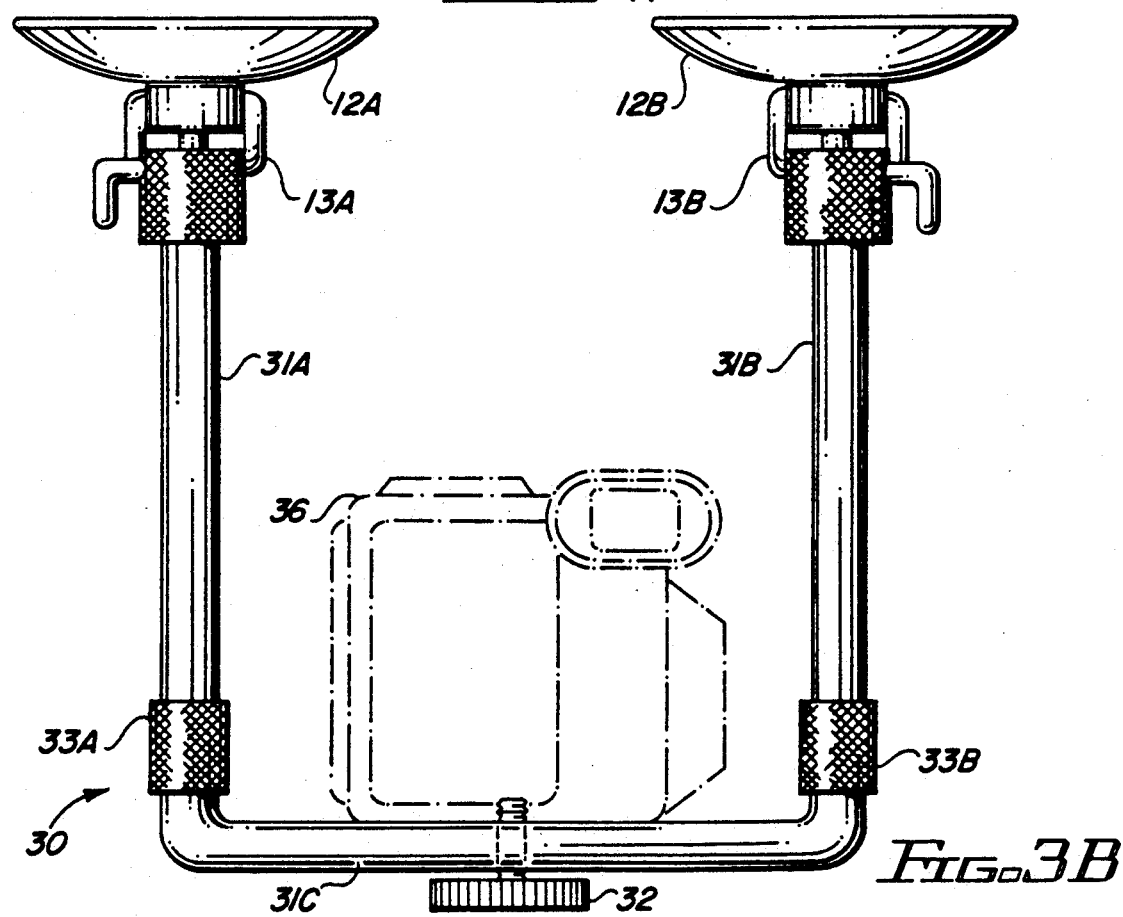
FIG. 3B is a side view of an assembled embodiment discussed in FIG. 3A.
Figure 3A:
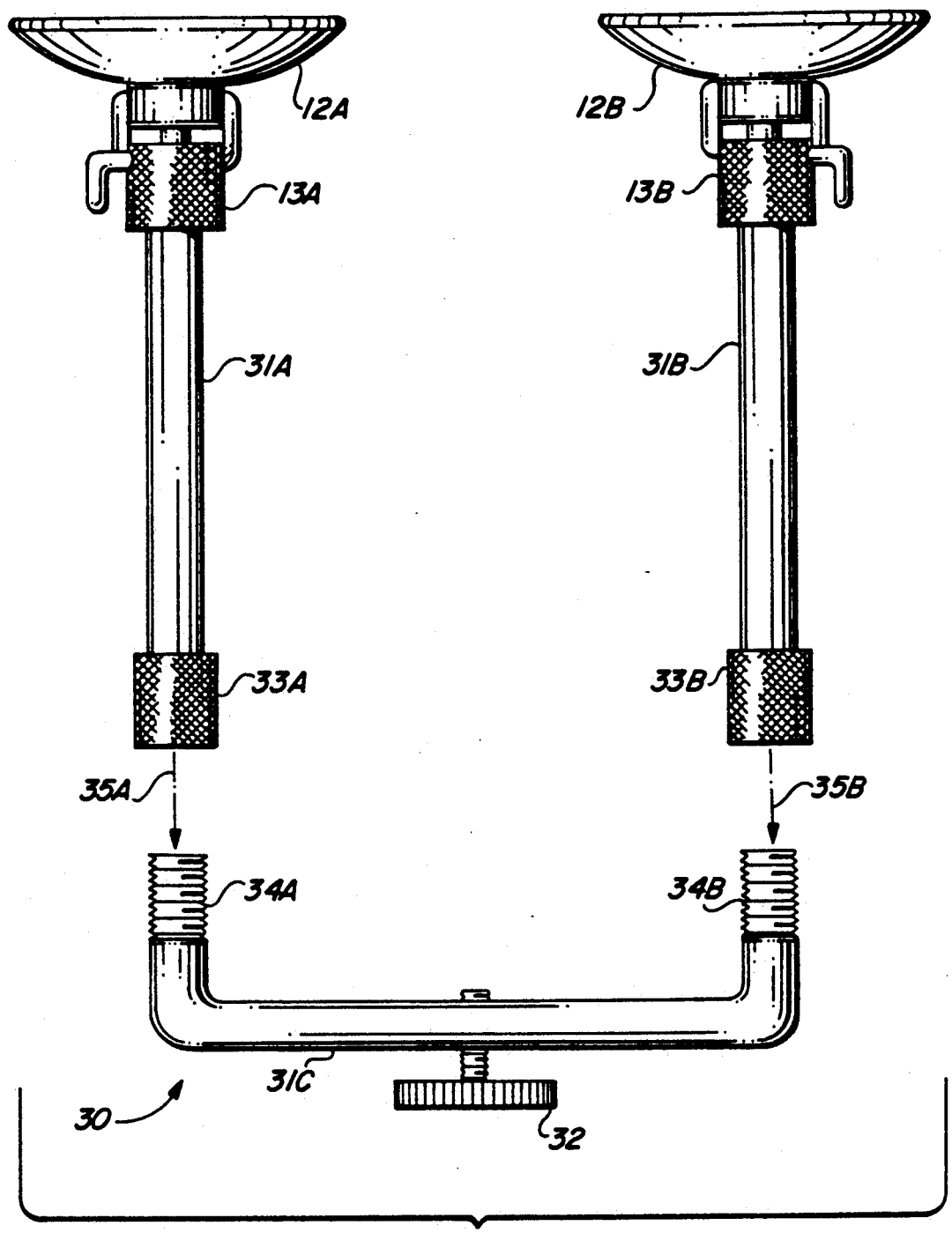
FIG. 3A is a side view of a disassembled alternative embodiment of the invention.

FIG. 3A is a side view of a disassembled alternative embodiment of the invention.

This embodiment is collapsible so that it can be easily transported in a bag or like. In this embodiment, suction cup 12A is attached to leg 31A via swivel block 13A. In like manner, suction cup 12B is attached to leg 31B via swivel block 13B.

Middle member 31C has its ends threaded, 34A and 34B, so as to receive locking nuts 33A and 33B from legs 31A and 31B respectively. This attachment, as indicated by arrows 35A and 35B completes the mount for use. Securing mechanism 32 extends through middle member 31C so as to secure the camera (not shown).

FIG. 3B is a side view of an assembled embodiment discussed in FIG. 3A.

The assemblage of leg 31A, middle member 31C, and leg 33B creates a camera support mount suitable for attachment of camera 36.

This embodiment, being collapsible, is easily transported and useful in a variety of situations.

It is clear from the foregoing that the present invention creates a highly improved camera mount for use in a variety of situations and especially useful for filming or taping through the windshield of a vehicle.

What is claimed is:
1. A portable mount comprising:
   a) a bracket having,
      1) two legs, and,
      2) a middle member, said middle member connecting said two legs;
   b) a fastening means positioned on said middle member for securing an object to said middle member;
   c) two securing means for selective attachment to a planar surface and being swivelally connected to said legs of said bracket;
   d) a brace member having a first end and a second end, said first end of said brace member being slideably attachable to said middle member.

2. The mount according to claim 1 wherein the second end of said brace member is encircled by a cushioning mechanism.

3. The mount according to claim 1 further including a third securing means swivelally connected to the second end of said brace member.

4. The mount according to claim 3 wherein said securing means are operator activatable suction cups.

5. The mount according to claim 4 further including an interconnection means for rigidly interconnecting the end portion of said two legs.

6. The mount according to claim 4 wherein said legs are disconnectable from said middle member.

7. A camera system for mounting to a vehicle's windshield, said system comprising:
   a) a bracket having,
      1) two legs each of which having an end portion, and,
      2) a middle member, said middle member connectable to said two legs at substantially right angles to each of said legs, said middle member having a camera fastening mechanism positioned substantially in the center of said middle member;
   b) two suction cups, each suction cup swivelally attached to one of said legs, each of said suction cups attachable to a vehicle' windshield; and,
   c) a camera for automatically recording a series of images, said camera being attached to the camera fastening mechanism such that said camera is focussed on images exterior to said vehicle.

8. The camera system according to claim 7 further including a brace member having a first end and a second end, said first end of said brace member being attachable to said middle member.

9. The camera system according to claim 8 wherein said first end of said brace member is slideably attachable to said middle member.

10. The camera system according to claim 9 wherein the second end of said brace member is encircled by a cushioning mechanism.

11. The camera system according to claim 9 further including a third suction cup connected to the second end of said brace member.

12. The camera system according to claim 7 further including an interconnection member being connectable to the end portion of said two legs.

* * * * *